United States Patent

Srinivasan

Patent Number: 5,253,190
Date of Patent: Oct. 12, 1993

[54] WEIGHTED TEMPERATURE MEASUREMENT USING MULTIPLE SENSORS

[75] Inventor: Jagannathan S. Srinivasan, Murrysville, Pa.

[73] Assignee: Westinghouse Electric Corp., Pittsburgh, Pa.

[21] Appl. No.: 906,994

[22] Filed: Jul. 1, 1992

[51] Int. Cl.$^5$ ............................................. G06G 7/12
[52] U.S. Cl. ..................................... 364/581; 376/247
[58] Field of Search ............... 376/247, 245, 246, 249; 364/581, 575, 574, 579; 340/508; 976/DIG. 223, DIG. 301

[56] References Cited

U.S. PATENT DOCUMENTS

| | | | |
|---|---|---|---|
| 3,998,693 | 12/1976 | Musick | 376/217 |
| 4,926,364 | 5/1990 | Brotherton | 364/581 |
| 5,024,802 | 6/1991 | Srinivasan | 376/258 |

OTHER PUBLICATIONS

Monitoring Temperature Reactivity Coefficient by Noise Method in a NPP at Full Power by O. Aguilar, Ann. Nuclear Energy, vol. 14, No. 10, pp. 521-526, 1987.
Temperature Measurement in Nuclear Reactors by Noise Thermometry by Brixy.
Nuclear Instruments and Methods 97(1971)75-80.
An In-Reactor Temperature Monitor by Hofman, Nuclear Technology, vol. 19, Sep. 1973, pp. (204-206).

*Primary Examiner*—Donald P. Walsh
*Assistant Examiner*—Meena Chelliah
*Attorney, Agent, or Firm*—J. C. Valentine

[57] ABSTRACT

Three fast response resistance temperature sensors (A, B, C) are spaced 120 degrees apart on a circular plane normal to fluid flow in the hotleg (14) from a nuclear reactor (10). Each sensor produces a temperature signal and is assigned a weighting factor, between zero and one hundred percent, in inverse proportion to the relative magnitude of the temperature fluctuation. The sensor with the smallest signal fluctuation receives the highest weighting factor. The sum of the factors equals one hundred percent. The temperature associated with a sensor (A, B, C) is multiplied by the sensor's respective weighting factor, to produce a second temperature. The actual temperature for the hotleg (14) is the sum of the second temperatures.

6 Claims, 1 Drawing Sheet

WEIGHTED TEMPERATURE MEASUREMENT USING MULTIPLE SENSORS

TECHNICAL FIELD

This invention relates to techniques for measuring fluid temperatures and, in particular, using multiple sensors in a fluid line to measure the temperature of fluid flowing through the line, such as the "hotleg" of a steam generator line of a nuclear reactor.

BACKGROUND OF THE INVENTION

U.S. Pat. No. 5,024,802 shows a method for controlling steam boiler level in a steam generator of a nuclear plant. In a nuclear plant, temperature probes are located in the high temperature fluid flow line or "hotleg", shown in that patent under reference numeral 31. The hotleg temperature is measured in conjunction with the temperature in the cold leg, the return line from the steam generator 34. To measure the temperature, probes such as thermally responsive resistors are placed at various points on a circular plane normal to the fluid flow. A temperature is determined from each sensor. The temperatures for all the sensors are averaged, producing an average temperature ($T_{H\,AVG}$).

The temperature probes (sensors) rarely have the same temperature response characteristics. They produce thermal noise, the level is a function of probe temperature. With thermally responsive probes, the coldest resistance temperature probe may, be the noisiest. The average temperature ($T_{H\,AVG}$) may be incorrect as a result. Repairs are made on the reactor system based upon the average temperature measurements. Therefore, the ability to determine the temperature of the hotleg of the reactor more accurately can translate into less frequent service intervals.

DISCLOSURE OF THE INVENTION

An object of the present invention is to provide an improved technique for measuring the temperature in the hotleg of a steam generator.

According to the present invention, a plurality of temperature sensing probes, such as thermally responsive resistors, are placed at equiangular locations on a circular plane normal to the hotleg fluid flow. The temperature measured by each sensor is determined and the range of temperatures produced by the sensors is referenced against a stored weighting factor scale on which weighting factor increases with probe temperature. The sensor producing the lowest temperature is the noisiest and is given a first waiting factor. The temperature probe producing the a higher temperature fluctuation is given a weighting factor greater than the first factor. Temperature sensors producing temperature fluctuation between the lowest and the highest are assigned intermediate weighting factors, the factors decreasing with probe temperature fluctuation. The sum of all the weighting factors totals 100%. The temperature for each probe is multiplied by the probe's assigned weighting factor, producing a "corrected probe temperature." The hotleg fluid temperature is computed by summing all the corrected temperature values.

A feature of the present invention is that the bias or offset error in the aggregate measured temperature is reduced to repeatable value. The bias or offset associated with each sensor can be measured when the fluid temperature is at a static base level. From this offset, the temperature in the hotleg can be determined even more precisely if so desired by adding an offset to the corrected temperature.

Other features, benefits and attributes of the present invention will be apparent to one skilled in the art from the following drawing and discussion that follows.

BEST MODE FOR CARRYING OUT THE INVENTION

Figure 1:
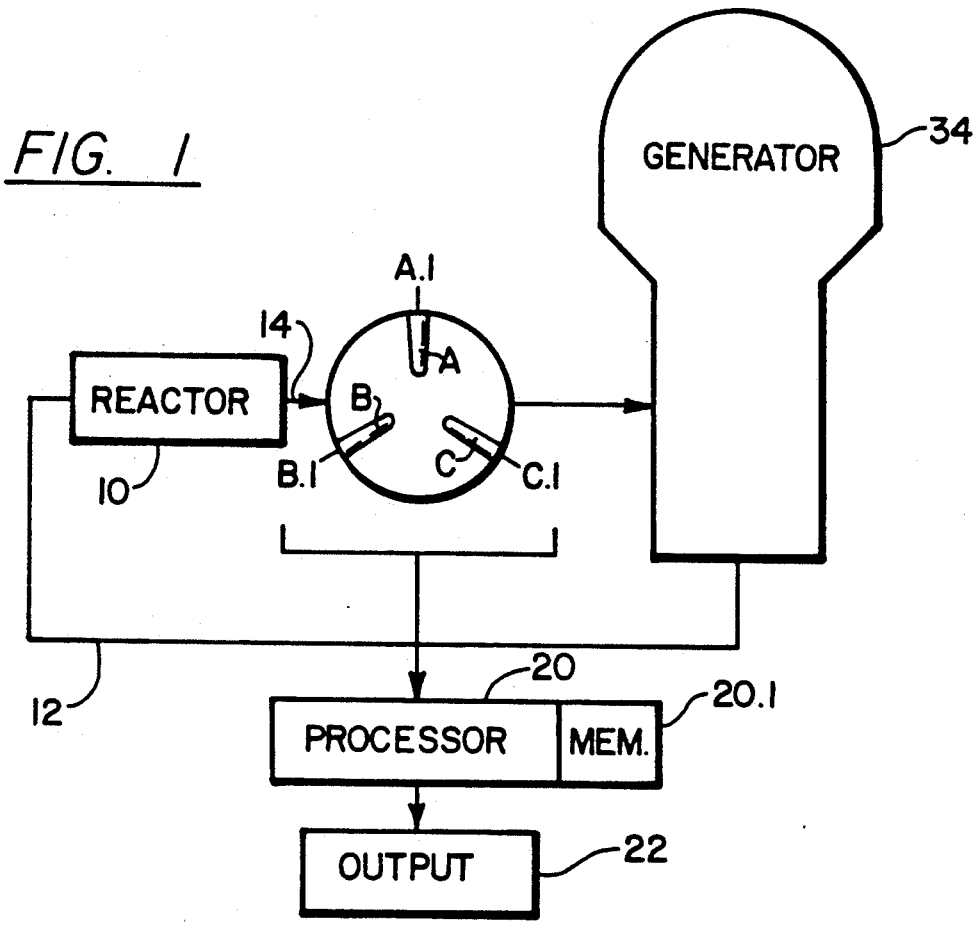
FIG. 1 is a schematic of a steam generation system embodying the present invention.
Figure 2:
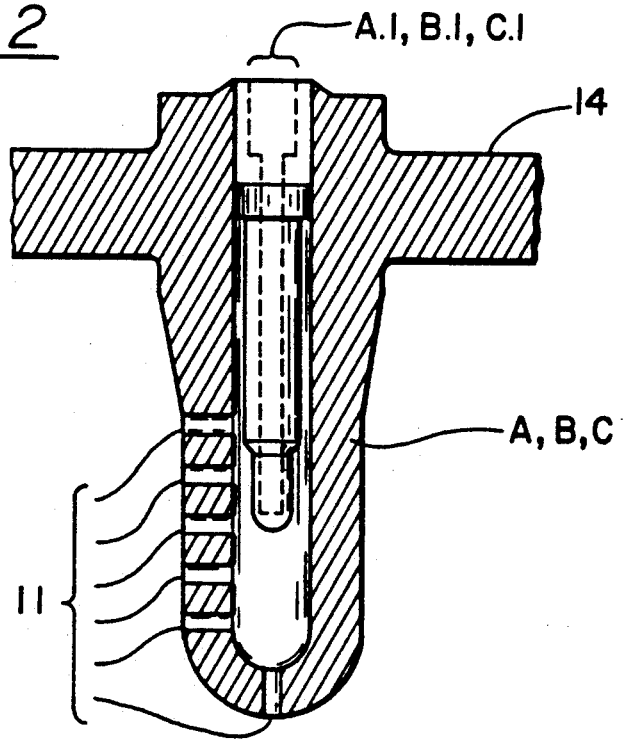
FIG. 2 is a cut-away view of a portion of a hotleg with a receptacle containing a thermally responsive temperature resistance therein.

Referring to FIG. 1, a nuclear reactor 10 receives water over a line 12 and heats the water, which exits the reactor on a line 14, the "hotleg". For the purposes of clarity, the hotleg is simplistically exploded in part in FIG. 1 to show that there are three sensors A, B and C spaced apart 120 degrees on a circular plane which is normal to the flow of fluid. The sensors typically are thermally responsive resistance devices; that is, devices whose resistance change as a function of temperature. As FIG. 2 shows, the sensors are located within a special housing that forms part of the hotleg wall. The housing contains a plurality of ports 11 that allow fluid to come in contact with the sensor (probe). Each probe has two leads A.1, B.1, C.1 (for probe A, B and C respectively) by which it is connected in FIG. 1 to a simplistically shown signal processor 20 containing a memory unit 20.1. Based upon the measured probe resistance, as determined over the lines to the processor, the processor 20 produces an output display or indication 22 of the temperature. The water that flows through the hotleg enters a steam generator 34 and it leaves the steam generator in a cooler state over the line 12.

In the prior art, the temperature of the water is sensed by the probes A, B and C and the following equations are used to determine the average temperature ($T_{H\,AVG}$), a computation made on the assumption that each probe is one-third of the average temperature.

(1) $T_{H\,AVG} = \frac{1}{3}(T_{H\,AVG} + B_A) + \frac{1}{3}(T_{H\,AVG} + B_B) + \frac{1}{3}(T_{H\,AVG} + B_C) =$
$\frac{1}{3}(T_{H\,AVG} + T_{H\,AVG} + T_{H\,AVG}) + \frac{1}{3}(B_A + B_B + B_C) =$
$T_{H\,AVG} + \frac{1}{3}(B_A + B_B + B_C)$ (2) Therefore, $B_A + B_B + B_C = 0$ In these equations, the individual temperatures $T_A$, $T_B$, $T_C$ of each probe are defined by the following relationships to $T_{H\,AVG}$ where $B_A$, $B_B$, and $B_C$ are offset or bias levels for each probe such that $T_{H\,AVG}$ and $T_{A,\,B\,or\,C}$ equals the probe temperature.

Using the following example, assuming $T_A$ is equal to 295 degrees, $T_B$ is equal to 303 degrees and $T_C$ is equal to 302 degrees, equation one appears as follows (where again it will be noted that $B_A$ plus $B_B$ plus $B_C$ equals 0 per equation (2)).

$$T_{H\,AVG} = \tfrac{1}{3}(295) + \tfrac{1}{3}(303) + \tfrac{1}{3}(302) = 300 \qquad (3)$$

$$B_A + B_B + B_C = -5 + 3 + 2 = 0 \qquad (4)$$

According to the inventive method, however, a different approach is taken. Different weighting factors $W_{A, B \text{ or } C}$ are assigned to $T_A$, $T_B$ and $T_C$ based upon their relative magnitudes. Assuming that $T_A$ produces the lowest measured temperature, it receives the smaller weighting factor. For example, if we assume that the weighting factor for $T_A$ is 20% and the weighting factor for $T_B$ and $T_C$ are each 40% (note that the total equals 100%) equation 1 then appears as follows using the inventive process. Then:

$$T_{H\,AVG} = 1/5(T_A) + 2/5(T_B) + 2/5(T_C) \quad \text{Equation (4)} \tag{5}$$

$$T_{H\,AVG} = 1/5(T_{H\,AVG} + B_A) + 2/5(T_{H\,AVG} + B_B) + 2/5(T_{H\,AVG} + B_C) \tag{6}$$

Following through on the equation, one ultimately finds that $T_{H\,AVG}$ follows the following relationship.

$$T_{H\,AVG} + 1/5(B_B + B_C) \tag{7}$$

and $$B_A + B_B + B_C = 0 \tag{8}$$

Using the previous example, $$T_{H\,AVG} = 1/5(295) + 2/5(303) + 2/5(302) = 301 \tag{9}$$

This temperature is higher by degree than the temperature computed using the current method. This equals 20% of sum of $B_B$ and $B_C$.

The error can be obtained from Equation 7.

$$\text{ERROR} = 1/5(B_B + B_C) \tag{10}$$

It can be seen, therefore, that by assuming a 20% factor to the noisiest probe $T_A$, the error is 20% of the sum of the offsets from the other two probes. This error can be accounted for in the analysis or in scaling. Moreover by assigning only 20% weighted factor to the noisiest probe, the impact of the temperature fluctuation can be reduced and operating margins can be increased as a result.

Also, if the peak to peak noise is 2%, the state of the art averaging method will reflect the same 2%. On the other hand, using the weighted average method of the invention, the contribution of the noise level is reduced by 16% because of the weighting factor. This 16% reduction will result in about a 2%-3% gain in overall temperature margin.

With the benefit of the foregoing discussion, one skilled in the art may be able to make modifications in whole or in part to the best mode for carrying out the invention without departing from the true scope and spirit of the invention set forth in the following claims.

I claim:

1. A method for indicating the temperature of fluid in the hotleg of steam supply system using at least three fast response resistance temperature sensors spaced 120 degrees apart on a circular normal to fluid flow, each sensor producing a temperature signal, characterized by the steps:

determining a first sensor temperature for each sensor from a temperature signal produced by the sensor;

assigning each sensor with a weighting factor between zero and one hundred percent in proportion to the relative magnitude of said temperatures, a sensor with the highest first sensor temperature receiving the highest weighting factor and a sensor with the lowest first sensor temperature receiving the lowest factor, the sum of the factors for all sensors being one hundred percent;

multiplying each first sensor temperature by the weighting factor assigned to the sensor to produce a second sensor temperature for each sensor; and summing said second sensor temperatures.

2. A method for indicating the temperature of fluid in the hotleg of steam supply system using at least three temperature sensors spaced on a circular plane normal to the flow of the fluid, each sensor producing a temperature signal, characterized by the steps:

determining a first sensor temperature for each sensor from a temperature signal produced by the sensor;

assigning each sensor a weighting factor between zero and one hundred percent in proportion to the relative magnitude of said temperatures so that a sensor with the lowest first sensor temperature receives the lowest weighting factor and a sensor with the highest first sensor temperature receives the highest factor, the sum of the factors for all sensors being one hundred percent;

multiplying each first sensor temperature by the weighting factor assigned to the sensor to produce a second sensor temperature for each sensor;

computing a sum of said record sensor temperatures; and subtracting a stored offset from the sum of said second sensor temperatures, the offset being derived by computing the average value for the second sensor temperatures, computing for each of the sensors except the sensor with the lowest temperature, the difference between said average value and the second sensor temperature, computing a sum of each difference and multiplying the sum by the weighting factor assigned to the sensor with the lowest temperature.

3. The method described in claim 2 further characterized in that each temperature sensor comprises a fast temperature response resistance.

4. A temperature measuring apparatus having at least three temperature sensors spaced apart along a circular pattern normal to the flow path of a liquid temperature measurement means connected to the sensor for producing the temperature signal characterized in that:

said means includes signal processor means for determining the relative magnitudes of the temperature indicated by the sensors, for assigning a weighting factor between zero and one hundred percent to the sensors in proportion to said magnitudes so that a sensor producing the lowest temperature receives the lowest weighting factor and a sensor producing the highest temperature fluctuation receives the highest weighting factor, for multiplying the temperature associated with each sensor by the weighting factor assigned to the sensor to produce a measured temperature component for each sensor, and for summing said measured temperature components to produce a signal indicating the temperature signal.

5. The temperature measuring apparatus described in claim 4, further characterized in that each temperature sensor comprises a temperature responsive resistance and said means includes means for measuring the change in resistance of each sensor.

6. The temperature measuring apparatus described in claim 4, further characterized in that said signal processor means includes means for subtracting a stored offset to the sum of said measure temperature components, the offset being derived by computing the average value for the sensor temperatures, computing, for each of the sensors except the sensor with the lowest temperature, the difference between said average value and the sensor temperature, computing a sum from each difference and multiplying the sum by the weighting factor assigned to the sensor with the lowest temperature.

* * * * *